United States Patent [19]
Jensen et al.

[11] 4,091,516
[45] May 30, 1978

[54] TIRE RASP BLADE HAVING MULTI-CUTTING EDGES

[75] Inventors: Wayne Emil Jensen, Homewood; Charles Keith Stanfield, Matteson, both of Ill.

[73] Assignee: B. & J. Manufacturing Company, Glenwood, Ill.

[21] Appl. No.: 795,538

[22] Filed: May 10, 1977

[51] Int. Cl.² .................... B23D 71/00; B26D 1/00
[52] U.S. Cl. .............................. 29/79; 76/101 SM; 29/78
[58] Field of Search ............. 29/78, 79; 407/30, 31, 407/61, 62; 76/101 SM

[56] References Cited

U.S. PATENT DOCUMENTS

| | | | |
|---|---|---|---|
| 3,528,151 | 9/1970 | Walter | 29/78 |
| 3,879,825 | 4/1975 | Jensen et al. | 29/79 |
| 4,021,899 | 5/1977 | Jensen | 29/79 |

*Primary Examiner*—Leonidas Vlachos

*Attorney, Agent, or Firm*—George F. Lee

[57] ABSTRACT

The outer edge of teeth of tire buffing machine blades is interrupted by oppositely curved arcuate slots which are cupped on centers disposed below the center on which the adjacent one of the leading and trailing deeper cutting side edges of the tooth are cupped. Between said arcuate slots, the outer edge has a shallower arcuate notch the ends of which are obtuse to the tooth outer edge. The portions of the tooth outer edge between the arcuate slots and the tooth cutting side edges are displaced laterally to opposite sides of the teeth and the inner portions of the tooth outer edge between said arcuate slots and the notch are transversely offset to the remainder of the tooth such that the teeth successively present to the tire surface being buffed a first sharply acute deeply cutting edge, then a sharply acute lighter cutting edge of shallower depth followed by an obtuse buffing edge and a more bluntly obtuse second buffing edge which act to finish the tire surface to a required texture.

20 Claims, 6 Drawing Figures

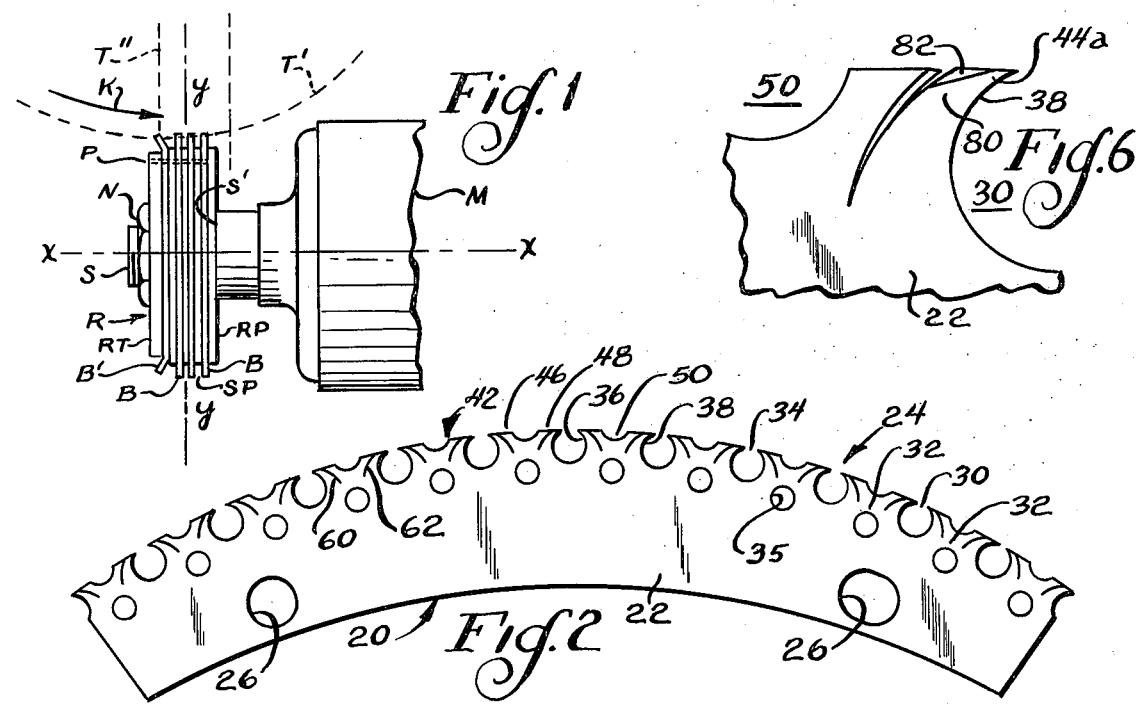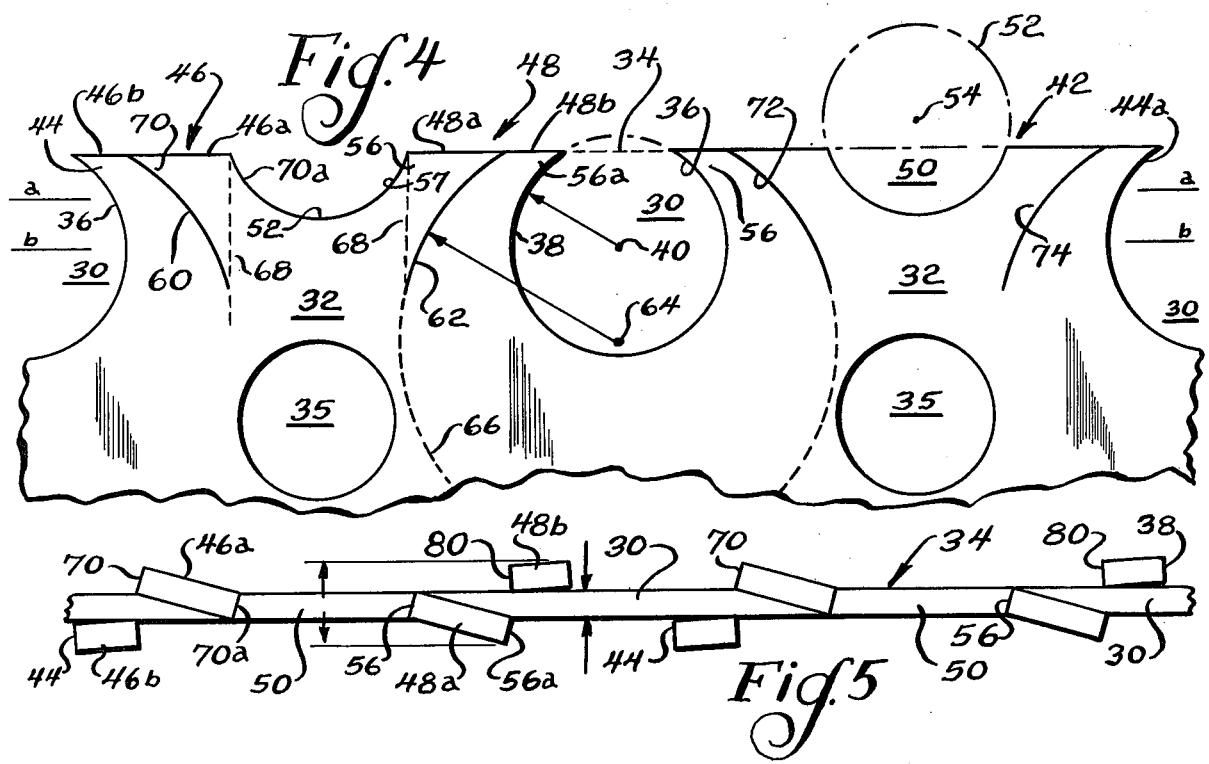

TIRE RASP BLADE HAVING MULTI-CUTTING EDGES

This invention relates to tire buffing machine blades and more particularly to such blades having a novel and improved construction of teeth which has been found to be particularly effective in their attack on the surface of the tire being buffed as well as being durable and resistant to both breakage and heat generation in use.

In our U.S. Pat. No. 3,879,825 issued Apr. 29, 1975, we disclosed buffing machine blades having a working edge interrupted by regularly spaced relatively deep primary cutouts and intermediately located smaller-sized secondary cutouts. The larger primary cutouts separate said working edge into spaced teeth having hookshaped leading and trailing side edges which are acutely set to the outer tooth edge. The smaller-sized cutouts interrupt the outer edge of the teeth also at sharply acute angles thereto. The trailing edge of said notch, therefore, like the leading side edge of the teeth assured a positive rake angle and were described as effective in cutting the old tread from the tire carcass against which they were directed in rotating the hub in which such blades were mounted. On opposite sides of the secondary cutouts, therebetween and the primary cutting edges of the teeth, the outer edge of the teeth is interrupted by inwardly converging linear slits or slots, the trailing edges of which are described as useful to buff or finish the surface of the tire which remains after the action of the primary and secondary cutting edges thereon.

The present invention improves upon the blades disclosed in our prior U.S. Pat. No. 3,879,825 by the new shape and relocation of the secondary cutouts at a shallower depth below the teeth outer edge such that the leading and trailing edges of the notch are obtusely inclined to the tooth outer edge, and the convergingly related slits or slots on either side of the notch which are cupped about centers spaced below the centers on which the adjacent one of the leading and trailing side cutting edges of the teeth are cupped. As afterwards explained more in detail, the result is a rearrangement of the cutting and buffing action of the teeth edges with a noticeable improvement in performance as well as increased blade-life. In the description of the invention which follows and also in the claims, where the term "slot" is used it is to be understood that the term also includes a "slit", unless the contrary is so stated.

A particularly important feature of the invention is that each of the four cutting edges which comprise the outer edge of the teeth in either direction in which the blade is rotated by the hub in which the blades are mounted, is given a specific set which combines with the new shape of said edges to achieve said improvement in utility.

Thus, in accordance with this invention, the terminal portions of the teeth outer edge between the arcuate slots and the respective leading and trailing side edges are displaced laterally to opposite sides of the tooth and so as to be spread apart a distance approximating the thickness of the material of which the teeth are constituted. The inner portions of the teeth outer edge, that is, the portions between the arcuate slots and intermediately disposed notch are offset transversely to the tooth body such that the trailing edge of the arcuate slot immediately behind the leading cutting edge of the tooth is disposed to the side of the tooth body opposite that to which the leading edge of the second arcuate slot which trails the notch is disposed.

Thus, each of the teeth of a buffing machine blade in accordance with the invention, in either direction of hub rotation, presents first a heavy-duty primary cutting edge which is sharply acute to the outer edge and capable of digging deeply into the tire carcass. This is followed by a second cutting edge of shallower depth but also sharply acute to the tooth outer edge which completes the cutting off of material from the tire to the desired depth. Thereafter, the obtusely-angled trailing edge of the notch initiates the buffing action on the remaining surface which is finished by the more blunted obtuse angled trailing edge of the second arcuate slot.

A feature of the invention is the protection which is afforded to the shallower secondary cutting edge; first, because it follows closely behind the more rugged leading tooth side edge and, secondly, because of its specific shape and related setting.

A significant feature of the invention is the cupping of the arcuate slits or slots about centers spaced below the centers on which the primary cutting edges of the teeth are centered so that effectively, the leading outer terminal portion of the teeth containing the primary cutting edge is relatively narrow at its tire engaging end and progressively increases in width to impart strength and ruggedness thereto.

A further feature of the invention is that the arcuate shape of the first slot which interrupts the tooth outer edge ahead of the notch, first of all, defines a prong at the outer tooth edge which is severely acute; and, secondly, the shape and arrangement of material therebetween and the notch impart strength to said prong.

Still another feature of the invention is that said arcuate slots are cupped by swinging a radius on a center spaced below the center on which the tooth leading edge is cupped to define said shape of the primary cutting prongs, and that the slots are terminated at a depth below the depth of the succeeding notch where it remains effective to perform its cutting function and also is sufficiently strong to prevent breakout of the inner portions of the tooth outer edge between the arcuate slots.

A further feature of said rearrangement and setting of the four tooth edge portions providing said four cutting edges of the teeth is the better wear performance noted which effectively sharpens said portions to increase tooth performance on reversing of the blade.

An important feature of the invention is that the arcuate slots extend deep enough into the tooth so that each of the four cutting edges can be widely spaced to minimize heat build-up by enforcing air circulation around and about each tooth edge in rotation of the hub during the buffing or tread removing act.

Still another feature of the invention is the setting of said cutting edges which their shape and arrangement facilitates. Said setting not only contributes to tooth rigidity and strength but also enhances the cutting and buffing functions thereof.

A companion feature of the invention is that the attack of the cutting and buffing edges can be increased by stamping the blades from thinner sheet metal which permits increasing the separating spaces between the set teeth but without increasing the overall set of this tooth. This is reflected in blades that run cooler because less frictional heat is generated in use and the enforced air circulation about the cutting edges is greater; wherefore, blades according to the invention are particularly useful in buffing radial tires.

In extensive tests conducted with tire rasps or hubs assembled with blades according to the invention, it has been noted that there is a considerable improvement in rate of rubber removal, this being in the order of a 50% increase, with a corresponding reduction in production of smoke. It has also been noted that the buffing equipment runs substantially cooler and requires up to 25% less power. The resultant texture provided the cleared surface of the tire carcass is substantially improved and provides a superior base to which the subsequently applied rubber adheres well when vulcanized thereto. There is also a substantial reduction in the noise level and to one more compatible to ecological noise standards and, in fact, to below the noise level of the driving motor.

All of these features and advantages result in an increased life to the blades with a resultant lowered cost per tire buffed.

Many other objects, advantages and features of the invention will be at once apparent and/or will become so upon consideration of the preferred embodiment of the invention which now will be described in connection with the figures of the appended drawing.

In said drawing:

FIG. 1 is a side elevational view of the rasp hub of a conventional tire buffing machine for which the blades of the present invention are adapted, the hub being shown mounted upon the rotated shaft of a motor with the tire being shown by phantom lines in two possible positions for buffing by rotation of the hub;

FIG. 2 is a plan view of a preferred embodiment of a blade comprising the present invention;

FIG. 3 is an edge view of the blade illustrated by FIG. 2 and shows the setting provided the outer edge portions of the teeth;

FIG. 4 is a greatly enlarged fragmented view of the working edge of a blade according to the invention;

FIG. 5 is an enlarged fragmented view of the edge of one tooth in accordance with the invention and details the setting imparted to the terminal and inner portions of the tooth outer edge; and FIG. 6 is a fragmented view of the tooth outer edge to show the sharpening of the trailing prong which is achieved in use of the blade.

Referring now more particularly to the several views wherein like parts are identified by like reference numerals, FIG. 1 illustrates apparatus commonly identified in the tire retreading industry as a tire buffing machine and which is used to remove the old tread from the crown and also, optionally, the adjacent shoulders from the carcass of a used tire in preparing the tire for a retreading or recapping operation as is well-known. In said FIG. 1, the illustrated apparatus comprises a tire rasp or hub R embodying an outer or top plate RT and a rear or pin bearing plate RP, both plates being centrally apertured to receive shaft S of a motor M. In one conventional construction, rear plate RP has fixed thereto axially directed pins P which as later described removably hold the blades B in spaced concentric relation about axis x-x of the hub R. Conventionally, blades B are separated as by spacers SP which are also suitably apertured so as to be supported by the aforementioned pins. The blades are so located that the teeth comprising their outer working edge extend beyond the periphery of the hub for attack on the outer periphery of tire T to remove the old tread therefrom as the hub periphery is moved thereto. As illustrated in FIG. 1, the working edge portion of the blades B are disposed generally in the plane of the blade body whereas the outer working portion of blades B' may be set at an angle thereto so as to remove material in large chunks from the tire ahead of the buffing function which the teeth of the succeeding blades B perform as more particularly described, for example, in U.S. Pat. No. 3,618,187 of W. E. Jensen, issued November 9, 1971. As illustrated at T', the tire may be supported to rotate in direction K about an axis disposed transversely of and conventionally at right angles to the axis x-x on which the tire rasp hub R turns during the buffing act. In other conventionally available buffing machines, the tire rotates about a supported axis disposed generally parallel to the axis of rotation of the rasp hub x-x, the disposition of a tire in the latter type of buffing machines being illustrated at T''. In either form of buffing machines, the supporting structure for the tire rasp or for the tire, or both, is adapted such that the tire and/or rasp moves transversely relative to the other and so that the action of the rasp on the tire extends across the full or required width thereof.

Blades in accordance with the present invention are stamped or otherwise formed of sheet metal to a generally concavo-convex shape as illustrated by FIG. 2 and usually comprise a segment 20 of an annulus of a predetermined angular extent. In the illustrated example, blade 20 has an angular extent of near 72° wherefor five blades arranged end-to-end will complete a full circle or angle of 360°. It, however, will be appreciated that the blades can comprise a different angular extent such that a smaller or larger number of blade segments, for example, four or six segments will be required to complete a full circle.

Each said segments 20 as illustrated in FIG. 2 comprise a main body 22 having generally flat parallel opposed surfaces, and the outer or convex edge of which embodies an interrupted or tooth containing working edge indicated generally at 24. As illustrated at B in FIG. 1, said working edge portion 24 my lie in the plane of the main body portion 22 of such blades; whereas in other blades such as illustrated at B', working edge portion 24 may be set at an inclined angle thereto. Body portion 22 of said blades is further provided with appropriately spaced openings 26, one of which openings may be slightly elongated and/or of larger diameter than the other to facilitate assembly of the blades over the provided pins P of the hub. Although, conventionally, the hub blade mounting pins are arranged in pairs corresponding in number to the number of blades required to complete a circle of blades; they also may be arranged in triplets for the same purpose. As previously suggested, top plate RT has similarly spaced complementary sized openings to receive the outer ends of said pins; and the assembly of blades and spacers Sp as aforementioned is completed as by tightening nut N on the threaded end of the shaft S, the inner hub plate RP being shown in FIG. 1 urged against a shouldered portion S' of said motor mounting shaft S. For a more complete and detailed description of the mounting of such blades within the provided hub R, reference may be had to our aforementioned U.S. Pat. No. 3,879,825.

In accordance with this invention, the utility of a buffing or tire tread removing machine is considerably enhanced by utilizing a novel construction of working edge, or teeth, on the blades which are assembled in the machine hub; and the construction of a preferred embodiment of the invention now will be described.

As illustrated by FIG. 2, working edge 24 of the blade or segment 20 comprising the present invention is regularly interrupted by large or primary cutouts 30 which divide said working edge into a plurality of equi-spaced and equi-dimensioned teeth 32. Each of primary cutouts 30 are circular in shape and within the confines of the working edge have an angular extent of less than 360° such that each circular cutout 30 which separate teeth 32 have a mouth 34 at the outer edge of the blade which is less than the diameter of the primary cutouts 30 and is preferably less than 75% of said diameter.

Preferably, heat dissipation means in the form of louvers or holes 35 are provided at the base of each tooth between the leading and trailing side edges thereof as more particularly described and claimed in our assignee's U.S. Pat. No. 4,021,899 issued May 10, 1977.

Referring now to FIG. 4 which schematically illustrates said teeth on a larger scale, each of teeth 32 has a concave-shaped leading side edge 36 comprising an arcuate segment of one of said primary circular cutouts 30 and a similar, but oppositely directed, concave-shaped trailing side edge 38 which embodies an arcuate segment of the next succeeding primary circular cutout 30. Level $b-b$ on which the centers 40 about which the leading and trailing side edges of the teeth are cupped is spaced below the outer edge 42 of the teeth 32 such that the portions of the teeth leading and trailing side edges 36, 38 above said level intersect the outer edge 42 of the teeth at a severely acute angle therewith as to define heavy-duty cutting prongs 44 which lead the tooth 32 in either direction of rotation and are set at a sufficiently strong positive rake angle so as to be capable of rapidly and deeply digging into the material of the tire carcass to remove heavy amounts of material with each rotation of the rasp hub.

To provide this acutely sharp disposition of the leading and trailing edges of the teeth, the diameter of cutouts 30 will have a length beteen $y/2x$ and $y/6x$ wherein $y$ equals the circumference of the rasp hub into which the blades are to be loaded and $x$ is the number of teeth in a circular row of blades required to complete the circumference of the rasp hub.

Still referring to FIG. 4, the outer edge 42 of each tooth is shown separated into two portions 46 and 48 by an intermediately disposed semi-circular shaped notch 50. Said notch comprises an arcuate segment of a circle 52, the center 54 of which is located above the outer tooth edge 42 such that the notch constitutes an arcuate segment having an angular extent of less than 180°, and the opposed sides of the notch intersect the tooth outer edge at a blunted obtuse angle therewith. In its preferred form, the diameter of the circle of which notch 50 is an arcuate segment is equal to at least one-quarter the diameter of the cutouts 30 and no more than twice said diameter. Moreover, the depth of said notch 52 should be equal at least to one-quarter of the diameter of said circle 52 and be no more than one-half its diameter. Thus, in either direction in which the blade moves, the trailing edge of the notch is presented at a negative rake angle to the tire surface being buffed at a distance behind the leading side edge 36 of the tooth to impart a buffed or finished texture to the remaining surface.

A feature of this invention is that portions 46 and 48 of the tooth outer edge to either side of notch 50 are in turn interrupted by arcuate-shaped slots or slits 60, 62 which further divide said portions into paired inner portions 46a and 48a and paired terminal portions 46b and 48b. The inner portions 46a and 48a have an angular extent of roughly twice that of the terminal outer edge portions 46b and 48b. As illustrated in FIG. 4, said arcuate slots 60, 62 comprise segments of respective circles 66 centered at 64 (level $c-c$) radially spaced below the center 40 on which the cutouts 30 are cupped.

In accordance with the invention, the radius of circle 66 of which said arcuate slots 60, 62 are segments has a dimension, preferably between twice the diameter of the cutout 30 and roughly three-quarters of said diameter; and the spacing of said center 64 radially below center 40 of cutouts 30 is selected such that the arcuate slots 60, 62 will not only interrupt the outer tooth edge closer to the adjacent tooth side edge (36 or 38 as the case may be) but will interrupt the same at a sharply acute angle equal to or exceeding that of the leading tooth side edge at 42. As a consequence, the terminal portions 46b and 48b are so shaped that they are narrowest at the outer tooth edge and progressively widen inwardly to a depth below level $a-a$ representing the notch depth. Thus said portions 46b and 48b are peculiarly shaped to facilitate attack of the tire surface against which they are engaged in use and prongs 44 are capable of digging deeply into the material of the tire carcass. Preferably, the length or depth of said arcuate slots 60, 62 should not substantially exceed twice the depth of notches 50 and in any event, should not substantially encroach within the limits defined by the terminal ends of the notch 52 as represented at 68; and should not be so long as to turn outwardly toward the adjacent tooth side edge. They should also terminate well short of the holes 35 which constitute heat dissipation means. Possible break out of the inner tooth portions 46a and 48a, in the rough treatment to which the blades are subjected in the buffing operation, is thus removed as a factor.

Conversely, it will be seen from FIG. 4, that as the arcuate slots 60, 62 extend into the depth of the tooth, they are so disposed that they remain spaced from the notch a distance always greater than one-half the width of the inner portions 46a, 48a at the tooth outer edge. This assures rigidity and strength to the secondary cutting prongs 70 which the trailing edge 72 of the arcuate segment 60 constitutes at the intersection or interruption of the tooth outer edge. Secondary cutting prongs 70 being set at a more acute angle (or positive rake) than the primary cutting prongs 44, but on the end of inner tooth portions 48b which are shorter than the terminal tooth portions 46b, are sufficiently sturdy and available to act behind the primary cutting prongs 44 to complete the material removal in preparation for the buffing action of the succeeding cutting edges of the teeth.

On the other hand, the trailing edge 74 of the arcuate slot 62 which is oppositely cupped, forms a strongly blunted obtuse angle at 80 with the outer tooth edge, said intersection 80 thereby constituting a prong set at an even more pronounced negative rake angle than the intersection 56 of the trailing edge of the notch 50 behind which it acts on the tire surface.

Referring now to FIG. 5, an important feature of the invention is the setting afforded to the inner and outer terminal portions of the teeth. As illustrated in said FIG. 5, the leading terminal portion 46b which contain the leading side edges 36 of the teeth are displaced laterally to one side of the tooth and the trailing terminal portion 48b are displaced laterally to the opposite side of the tooth 34 such that they lie in generally parallel planes spaced apart a distance approximating the tooth thickness. The two inner portions 46a and 48a of the tooth outer edge on either side of the notch 50 which contain the secondary cutting prong 70 and the obtuse prong 56 constituted by the trailing edge 57 at its interruption of the tooth center edge are offset laterally at a small angle in the order of 20° to 25° so as to lie in substantially parallel planes and directed to opposite sides of the tooth. Preferably, inner tooth portion 46a is offset such that its secondary cutting prong 70 lies just outside the tooth thickness. Simultaneously, inner tooth portion 48a is offset such that its rear edge or prong 56a just clears the opposite side of the tooth thickness; whereas, edge portions 70a and 56a remain substantially between the teeth surfaces.

By such setting, all four edges 44, 70, 56 and 80 in one direction of blade movement (and the four corresponding edges in reverse movement of the blades) are widely spaced both laterally and longitudinally with respect to the other cutting edges such that each of said edges is located for effective attack on the tire surface against which they are engaged in the buffing or detreading act. Moreover, each of said cutting edges is so spaced relative to the others that, in rotation of the hub in which they are mounted, air circulation is enforced thereabout and to all sides of the outer tooth bearing portions 46a, 46b, 48a and 48b. This minimizes heat generation in the teeth with frictional contact of their edges 44, 70, 56 and 80 as they cut into and/or buff the tire surface to the desired finish. At the same time, the tooth structure is reinforced by the setting of its four cutting edges bearing portions so that the teeth are rugged and resist breakage in their attack on the tire carcass. The sequence and setting of the four edges of the teeth, permits utilization of thinner sheet material then previously considered essential in a blade, for example, intended to be used in buffing radial tires, and without sacrifice of tooth strength. The use of thinner sheet metal means that the teeth cutting and buffing edges meet less frictional resistance in their attack of the tire surface, therefor they can more rapidly and deeply penetrate the tire surface with less frictional heat generation. In addition, the above-described separation of the edge bearing portions 46a, 46b, 48a and 48b can be increased to permit more air to circulate between the teeth portion; the total overall set cutting width of the tooth, however, remaining constant.

Another feature which is derived from the sequential arrangement and setting of the teeth portion is the wear pattern to which these portions are subjected. For example, as illustrated at 82 in FIG. 6, the strongly blunted obtuse end or edge 80 tends with long use to wear and round over. However, when the blade is reversed so that its intersection 44a with the tooth outer edge, becomes the primary cutting edge, the same is found to have produced a prong which is exceedingly sharp. Also as illustrated by FIG. 5, the secondary cutting prong 70, although offset from the primary cutting prong 44 which precedes it, follows tooth portion 46b sufficiently close, that it is effectively shielded thereby. The primary prong 44 by its leading position maintains the initial attack on the tire surface and lifting of material therefrom, whereas the trailing secondary cutting edge 70 follows immediately behind to complete and ready the tire surface for finishing by the succeeding buffing edges 56 and 80, and in that order.

It will be appreciated and should be understood that the invention is not to be considered as restricted to blades that are adapted for mounting in the tire rasp hub of FIG. 1. The invention rather is particularly concerned with the working edge of such blades irrespective of the design afforded the body of said blades which adapt them for mounting in a specific tire rasp or buffing hub. Thus the invention has utility where the working edge of such blades in non-arcuate or straight, as well as convex. The invention is applicable to the working edge of blades of both the disc and annular types wherein the working edge has an angular extent of 360°, as well as some fraction thereof. It is also applicable to blades of so-called reversible type wherein the blade has both inner and outer convex shaped working edges, either of which may be optionally disposed at the outer periphery of the rasp in use. The invention is also applicable to blades of the type such as are mounted in so-called disc hubs wherein the blades have straight working edges and are mounted on one side of a disc and/or so that their working edge is disposed generally parallel to the rotational axis of the hub rather than radial or at some angle thereto as in the hub illustrated by FIG. 1. Furthermore, the described teeth and their setting may comprise all or only some of the teeth of the working edge of the rasp blade. The invention may also be applied to blades in which the working edge comprises a single tooth. Exemplary of such blade types, and the hubs in which such blade types are mounted, are illustrated in U.S. Pat. No. 3,879,825 to which reference may be had and the subject matter thereof in this regard is incorporated herein by this reference thereto.

Thus in the aforesaid description it will be apparent that all of the recited objects, advantages and features of the invention have been demonstrated as obtainable in a blade by means of a tooth construction which is both convenient and economical to manufacture and at the same time is one that is particularly useful to the tire buffing and retreading industry.

Having described our invention, we claim:

1. A tire rasp blade having a body portion adapted for assembly in the hub of a tire buffing machine and a working edge portion embodying one or more teeth having an outer tooth edge, a leading side edge and a trailing side edge, said leading side edge embodying an arcuate segment of a circle having a center which leads said leading side edge and intersects the outer tooth edge at a sharply acute angle, the outer tooth edge being interrupted by a notch having a trailing edge which intersects the outer edge at a bluntly obtuse angle, and a first arcuate slot interrupting said outer tooth edge between said notch and the leading side edge, said first arcuate slot comprising a segment of a circle having a center preceding the leading side edge of the tooth, the trailing edge of the first arcuate slot intersecting said outer tooth edge at a sharply acute angle therewith, the leading side edge of the tooth being displaced to one side of the blade working edge portion, the trailing edge of the first arcuate slot being displaced to the opposite side thereof, and the trailing edge of the notch placed therebetween.

2. A tire rasp blade as claimed in claim 1 having a second arcuate slot interrupting said outer tooth edge between said notch and the trailing side edge of the tooth, said second arcuate slot comprising a segment of a circle oppositely disposed to that embodying the first arcuate slot and its trailing edge intersecting said outer tooth edge at a more severely blunted angle than does the trailing edge of the notch, said trailing edge of the second arcuate slot being displaced to the side of the blade working edge portion opposite to that of the tooth leading side edge and beyond the placement of the trailing edge of the notch.

3. A tire rasp blade as claimed in claim 2 wherein the arcuate slots interrupt the outer tooth edge further from the notch than from the respective tooth leading and trailing side edges.

4. A tire rasp blade as claimed in claim 2 wherein the arcuate slots terminate below the depth of the notch.

5. A tire rasp blade as claimed in claim 1 wherein the notch comprises an arcuate segment of a circle whose center lies above the outer tooth edge, said notch extending to a depth less than one-half the diameter of said circle.

6. A tire rasp blade as claimed in claim 2 wherein the trailing side edge of the tooth comprises an arcuate segment of a circle, the radius of which is of the same length as the radius of the circle of which the leading side edge of the tooth is an arcuate segment and whose center is at the same depth but trails the trailing side edge of the tooth, said trailing side edge of the tooth intersecting the outer edge at a sharply acute angle.

7. A tire rasp blade having a main body portion adapted for mounting in the hub of a tire buffing machine and a convex outer edge interrupted by a plurality of circular-shaped openings which define the leading and trailing edges of teeth therebetween, the width of the mouth of said opening between the teeth outer edges being substantially less than the diameter of said openings such that the leading and trailing side edges of the teeth defined therebetween are sharply acute to the outer edge of the teeth, the outer edge of the teeth having a notch intermediately disposed between the leading and trailing side edges of the teeth, said notch embodying an arcuate segment of a circle the center of which is above the outer tooth edge such that the lead and trail edges of the notch intersect the outer tooth edge at obtuse angles thereto, a first arcuate slot interrupting the outer edge portion of the tooth between the notch and the leading side edge of the tooth, a second arcuate slot interrupting the outer edge portion of the tooth between the notch and the trailing side edge of the tooth, said first arcuate slot embodying a segment of a circle the center of which leads the leading side edge of the tooth and is spaced below the center of the circle of which the leading side edge of the tooth is a segment, said second arcuate slot embodying a segment of a circle the center of which trails the trailing side edge of the tooth and is spaced below the center of the circle of which the trailing side edge of the tooth is a segment, said arcuate slots terminating below the depth of the notch and so as to leave substantial tooth material between the notch edge and adjacent tooth side edge, the trailing edge of the first arcuate slot being sharply acute to the outer tooth edge, the trailing edge of the second arcuate slot being severely obtuse to the outer tooth edge, the portion of the outer tooth edge between the leading side edge of the tooth and the first arcuate slot being displaced laterally to one side of the tooth, the portion of the outer edge of the tooth between the trailing side edge of the tooth and the second arcuate slot being displaced laterally to the opposite side of the tooth and the portions of the outer tooth edge between the notch and the arcuate slots being transversely offset to the teeth.

8. A tire rasp blade as in claim 7 wherein the terminal portions of the tooth outer edge between the tooth side edges and the arcuate slots are displaced to opposite sides of the tooth an amount substantially equal to the tooth thickness.

9. A tire rasp blade as claimed in claim 8 wherein the inner portions of the tooth outer edge between the notch and the arcuate slots are transversely set such that the leading edge of the inner portion between the first arcuate slot and the notch at the outer tooth edge clears the tooth thickness and the trailing edge of the portion of the outer tooth edge between the notch and the second arcuate slot clears the other side of the tooth thickness.

10. A tire rasp blade as claimed in claim 7 wherein the total set of the outer tooth edge portions approximates three times the tooth thickness.

11. A wire rasp blade as claimed in claim 7 wherein the diameter of the circular-shaped openings which define the leading and trailing side edges of the teeth has a length betweey $y/2x$ and $y/6x$ wherein $y$ is the circumference of the circle which the blade outer edge define when assembled in the tire buffing machine hub and $x$ is the number of teeth in said circumference.

12. A tire rasp blade as claimed in claim 11 wherein the circles of which the arcuate slots are segments have a radius between 75% and twice the diameter of the circular-shaped openings which define the leading and trailing side edges of the teeth.

13. A tire rasp blade as claimed in claim 7 wherein the arcuate slots have a length no less than the notch depth and not substantially greater than twice said notch depth.

14. A tire rasp blade as claimed in claim 7 wherein the arcuate slots are so related to the respectively adjacent leading and trailing tooth side edges that the tooth portions therebetween progressively increase in width from the outer tooth edge inwardly to the termination of the arcuate slots.

15. A tire rasp blade as claimed in claim 7 wherein the outer tooth edge portions between the arcuate slots and the notch are substantially wider than the separation of the arcuate slots from the respective leading and trailing side edges of the teeth at their outer edge.

16. A tire rasp blade as claimed in claim 15 wherein the separation of the arcuate slots from the notch at the outer tooth edge approximates twice the separation of the arcuate slots from the teeth outer side edges.

17. A tire rasp blade as claimed in claim 15 wherein the arcuate slots inwardly of the tooth outer edge do not come closer to the notch than one-half the separation of the arcuate slots from the notch at the outer tooth edge.

18. A tire rasp blade as claimed in claim 7 wherein the diameter of the circle of which the notch is an arcuate segment has a dimension between one-quarter and twice the diameter of the circular openings which define the leading and trailing side edges of the notch.

19. A tire rasp blade as claimed in claim 7 wherein the depth of the notch is between one-quarter and one-half the diameter of the circle of which the notch is an arcuate segment.

20. A tire rasp blade as claimed in claim 18 wherein the depth of the notch is between one-quarter and one-half the diameter of the circle of which the notch is an arcuate segment.

* * * * *

UNITED STATES PATENT AND TRADEMARK OFFICE
CERTIFICATE OF CORRECTION

PATENT NO. : 4,091,516
DATED : May 30, 1978
INVENTOR(S) : Wayne Emile Jensen & Charles Keith Stanfield It is certified that error appears in the above-identified patent and that said Letters Patent are hereby corrected as shown below:

Column 8, line 7, "in" should be --is--;

In the Claims:

Claim 11, column 10, line 18, change "wire" to --tire--;

Claim 18, column 10, line 58, change "notch" to --tooth--;

Signed and Sealed this

Twenty-fourth Day of October 1978

[SEAL]

Attest:

RUTH C. MASON
Attesting Officer

DONALD W. BANNER
Commissioner of Patents and Trademarks